United States Patent [19]

Kozawa et al.

[11] Patent Number: 4,870,916
[45] Date of Patent: Oct. 3, 1989

[54] SEWING MACHINE CAPABLE OF BEING EQUIPPED WITH ONE OF A PLURALITY OF OPERATING PANELS

[75] Inventors: Tetsuo Kozawa, Toyoake; Satoru Asano, Inazawa, both of Japan

[73] Assignee: Brother Kogyo Kabushiki Kaisha, Aichi, Japan

[21] Appl. No.: 190,145

[22] Filed: May 4, 1988

[30] Foreign Application Priority Data

May 11, 1987 [JP] Japan .................. 62-69762

[51] Int. Cl.$^4$ .............................................. D05B 19/00
[52] U.S. Cl. .............................. 112/121.11; 112/445; 112/457
[58] Field of Search .............. 112/445, 453, 454, 456, 112/457, 458, 121.11, 121.12, 275, 277, 451

[56] References Cited

U.S. PATENT DOCUMENTS

| | | | |
|---|---|---|---|
| 4,052,946 | 10/1977 | Rydz et al. | 112/445 |
| 4,335,667 | 6/1982 | Beckerman et al. | 112/445 |
| 4,365,566 | 12/1982 | Laidig | 112/458 X |
| 4,406,235 | 9/1983 | Eguchi | 112/445 |
| 4,727,818 | 3/1988 | Mizuno et al. | 112/121.12 X |

FOREIGN PATENT DOCUMENTS 63-43689  2/1988  Japan .

Primary Examiner—Peter Nerbun
Attorney, Agent, or Firm—Oliff & Berridge

[57] ABSTRACT

A sewing machine including a control device and a plurality of driving devices adapted to be controlled by the control device, in which one of a plurality of operating panels is selectably connectable to the control device. When one of the operating panels is connected to the control device, the control device controls the driving devices according to a selected additional control program. When none of the operating panels is connected to the control device, the control device controls the driving devices according to a basic control program. The operating panels are adapted to output discrimination signals peculiar to each of the operating panels so that the control device discriminates the operating panel selected and connected.

6 Claims, 9 Drawing Sheets

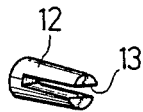
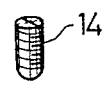
FIG.4   FIG.5
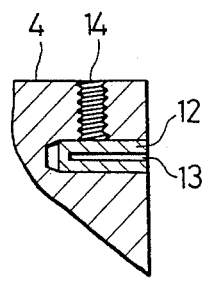
FIG. 6
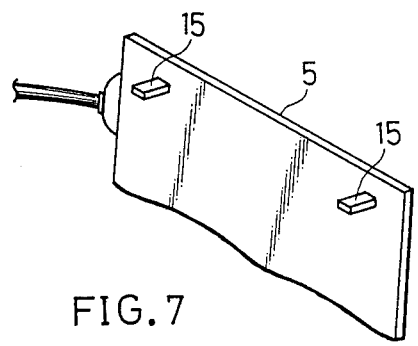
FIG.7

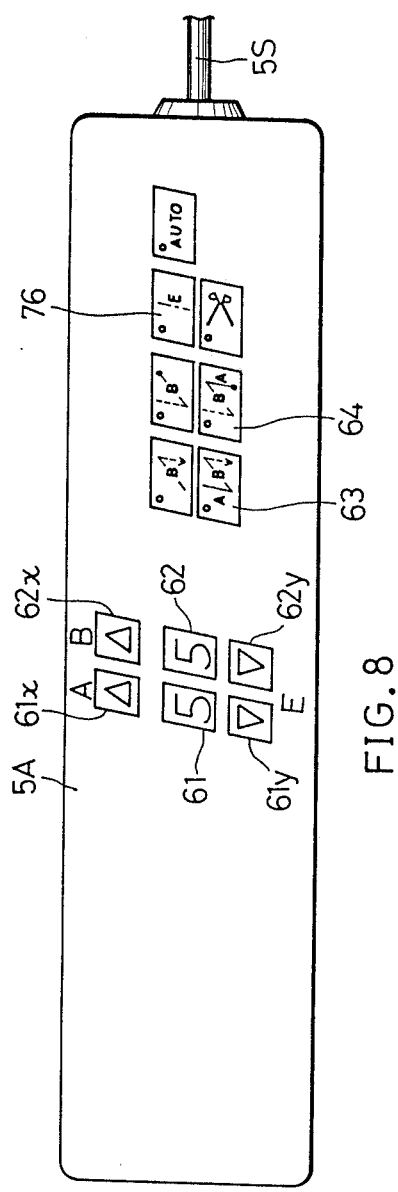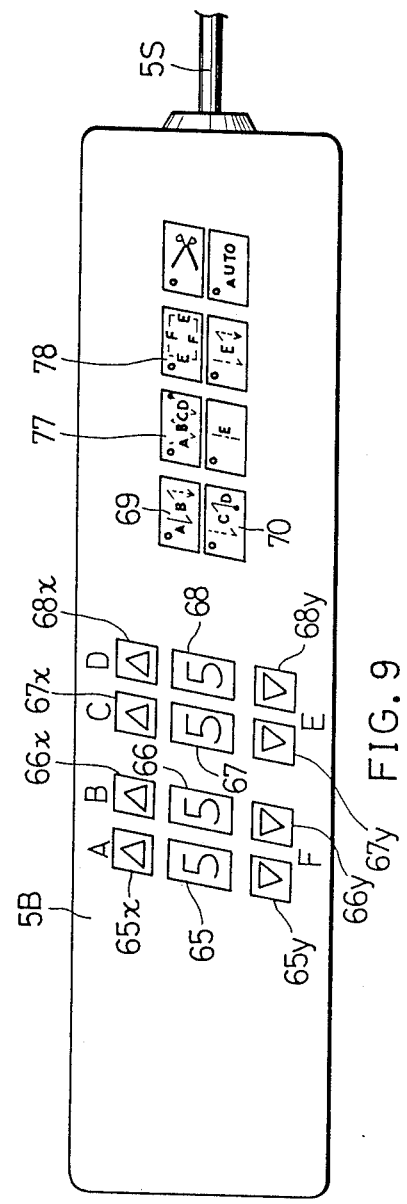

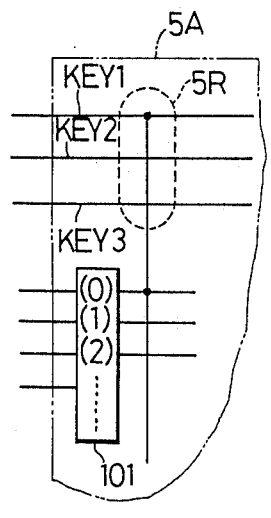
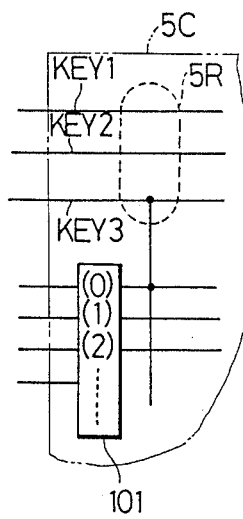
FIG.14　　　　FIG.15　　　　FIG.16

SEWING MACHINE CAPABLE OF BEING EQUIPPED WITH ONE OF A PLURALITY OF OPERATING PANELS

BACKGROUND OF THE INVENTION

The present invention relates to a sewing machine capable of effecting various improved functions by replaceably connecting one of a plurality of operating panels having functional keys.

Some of the conventional sewing machines have basic functions such as normal sewing and reverse sewing as basically required by a sewing machine, and further have additional functions such as start/end backtack sewing, continuous backtack sewing, stitch number sewing, pocket sewing and label attachment sewing.

However, some users do not require such additional functions, and some users require some but not all of the additional functions various requirements of the users can be met by providing a single type of sewing machine having all of the additional functions. According to this concept, however, some users are obliged to buy unnecessary functions, and the operation of the sewing machine is rendered complicated. To cope with this problem, a maker must produce various kinds of sewing machines to meet various requirements of all the users, causing a reduction of productivity in mass production.

Some measures for solving the above problem are disclosed in U.S. Pat. No. 4,052,946. This prior art sewing machine includes a machine body commonly having the basic functions, and also includes various kinds of control packages, one of which is selectively connected to the machine body, thus attaining the basic functions and various kinds of additional functions. In this prior art, a single type of the machine body is commonly utilized. However, each of the control packages includes an electronic circuit for controlling a sewing machine driving motor or the like, software for operating the electronic circuit and an operating panel for selecting various control modes. Accordingly, it is necessary to prepare a plurality of electronic circuitry, software and operating panels in correspondence with the number of control packages, causing an increased cost and a reduction of productivity in mass production.

Some measures for solving this problem are disclosed in Japanese Utility Model Publication No. 62-11578 (corresponding to Japanese Utility Model Laid-Open Publication No. 57-64280). This prior art sewing machine includes a common machine body, a common electronic circuit and common software for controlling the sewing operation, and also includes plural kinds of operating panels selectively connected to the machine body. The machine body includes selector switches corresponding to the operating panels, and the selector switches are manually selected according to the user's selection. In this prior art, most of the parts are commonly utilized. However, unless any one of the operating panels is attached to the machine body, the sewing machine cannot be operated. Thus, this prior art has yet some problems from the viewpoints of operability and cost.

Further, since the users must select the selector switches in the machine body according to the operating panel selected, there is a possibility that the users will erroneously select the switches or will not select the switches, causing improper operation based on the operating panel selected.

SUMMARY OF THE INVENTION

It is an object of the present invention to provide a sewing machine capable of effecting various improved functions by replaceably connecting one of a plurality of operating panels having plural kinds of functional keys which can effect simple operation and reduce manufacturing cost.

According to one aspect of the present invention, there is provided a sewing machine comprising a control device and a plurality of driving devices adapted to be controlled by the control device, said control device having a central processing unit, a memory connected to the central processing unit and an input/output interface connected to the central processing unit wherein the memory preliminarily stores a basic control program for normal operation of the sewing machine and a plurality of additional control programs for formation of a plurality of stitch patterns, and is adapted to store parameters to be used with the additional control programs, and further comprising a plurality of operating panels for selecting one of the additional control programs and inputting the parameters, wherein the operating panels are selectively connectable to the control device, and when one of the operating panels is connected to the control device, the control device controls the driving devices according to the additional control program selected and the parameters input through the operating panel connected, while when none of the operating panels is connected to the control device, the control device controls the driving devices according to the basic control program.

According to another aspect of the present invention, there is provided a sewing machine comprising a control device and a plurality of driving devices adapted to be controlled by the control device, said control device having a central processing unit, a memory connected to the central processing unit and an input/output interface connected to the central processing unit wherein the memory preliminarily stores a plurality of control programs for formation of a plurality of stitch patterns, and is adapted to store parameters to be used with the control programs, and further comprising a plurality of operating panels for selecting one of the control programs and inputting the parameters, wherein the operating panels are selectively connectable to the control device, and the operating panels are adapted to output discrimination signals peculiar to each kind of the operating panels, and when one of the operating panels is connected to the control device, the control device discriminates the discrimination signal output from the operating panel connected and controls the driving devices according to the control program selected and the parameters input through the operating panel connected.

The invention will be more fully understood from the following detailed description and appended claims when taken with the drawings.

BRIEF DESCRIPTION OF THE DRAWINGS

FIG. 4 is a perspective view of the guide pin to be mounted in the operating panel mounting portion;

FIG. 5 is a perspective view of the screw to be mounted in the operating panel mounting portion;

FIG. 6 is a sectional view of the operating panel mounting portion in which the guide pin and the screw are mounted;

FIG. 7 is a rear perspective view of the operating panel to be mounted on the operating panel mounting portion;

FIG. 8 is an elevational view of the first operating panel according to the present invention;

FIG. 9 is an elevational view of the second operating panel;

FIGS. 14, 15 and 16 are detailed circuit diagrams of parts of the first, second and third operating panels, respectively.

DETAILED DESCRIPTION OF THE PREFERRED EMBODIMENT

Figure 1:
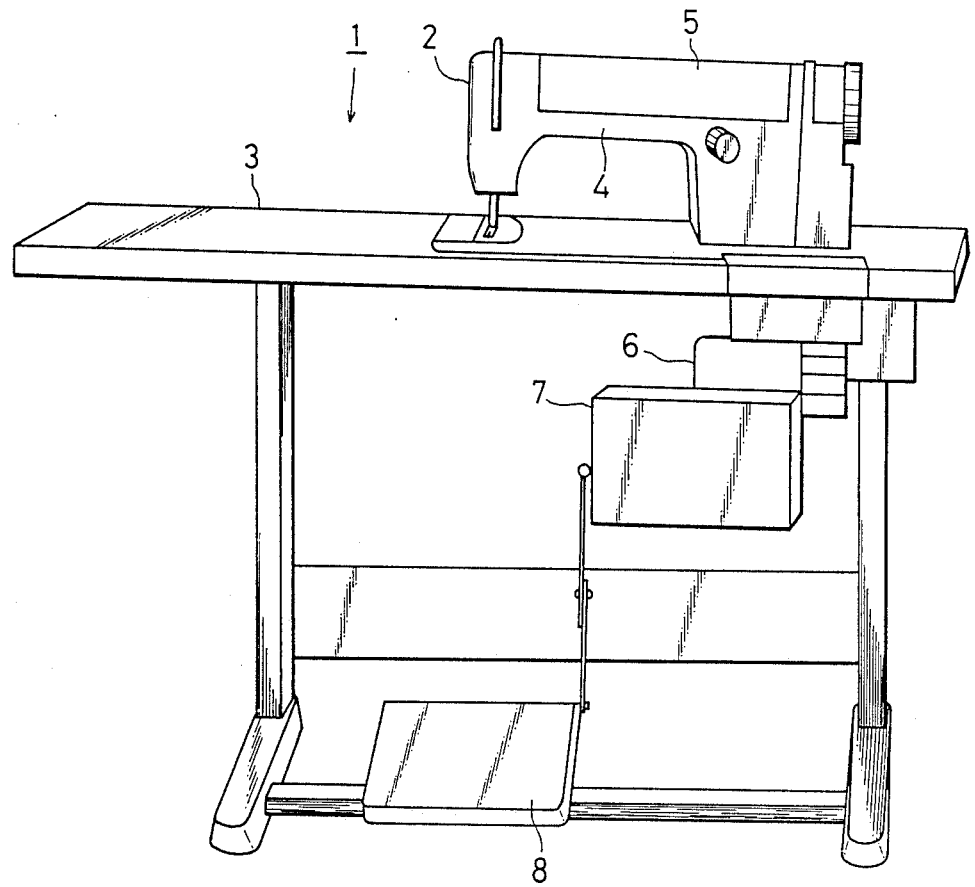
FIG. 1 is a schematic perspective view of the sewing machine according to the present invention.

Referring to FIG. 1 which shows a general perspective view of a sewing machine 1, a machine body 2 is mounted on a table 3. A arm portion 4 of the machine body 2 is provided with an operating panel mounting portion 9 (See FIG. 2) for replaceably mounting any one of plural kinds of operating panels 5 which are preliminarily manufactured so as to meet the various requirements of users for additional functions of the sewing machine. There are provided below the machine body 2 a motor 6 for driving the machine body 2 and a control box 7 including an electronic control circuit or the like for carrying out various controls. A treadle 8 is located below the table 3, and is connected with various switches, speed command device, etc. installed in the control box 7. When the treadle 8 is depressed forward, a needle driving speed is changed in accordance with an amount of depression, and when the treadle 8 is depressed back, thread cutting or the like is automatically carried out.

Figure 2:
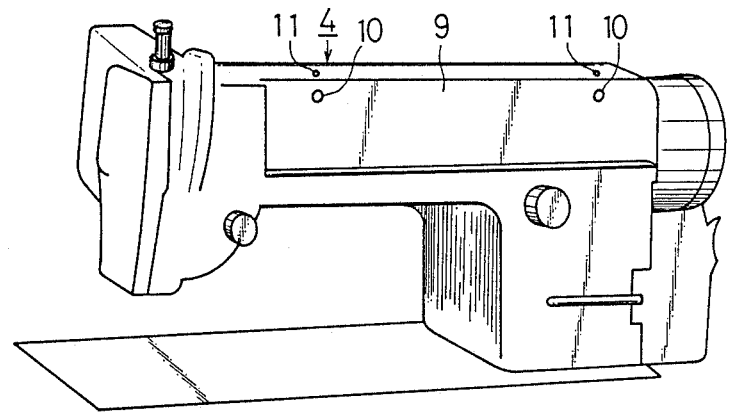
FIG. 2 is a perspective view of the machine body of the sewing machine shown in FIG. 1.
Figure 3:
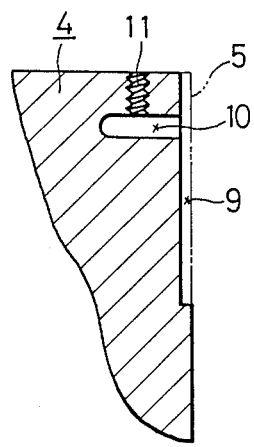
FIG. 3 is a sectional view of the operating panel mounting portion of the machine arm shown in FIG. 2.

Referring to FIGS. 2 and 3 which show a perspective view of the machine body 2 and a sectional view of the operating panel mounting portion 9, respectively, the operating panel mounting portion 9 comprises a recess with a depth substantially equal to a thickness of each operating panel 5. A pair of pin holes 10 are formed on the front surface of the recess at right and left positions thereof. An upper surface of the arm portion 4 is formed with a pair of tapped holes 11 having a center axis perpendicular to that of the pin holes 10.

Referring to FIGS. 4 and 5 which show a perspective view of a guide pin 12 to be inserted into each pin hole 10 and a perspective view of a screw 14 to be engaged with each tapped hole 11, respectively, the guide pin 12 is formed with an axial slot 13, and the screw 14 is so formed as to be threadedly engaged into the tapped hole 11 by means of a screwdriver or the like.

Referring to FIG. 6 which shows a condition wherein the guide pin 12 is set in the pin hole 10, and the screw 14 is set in the tapped hole 11, a lower end of the screw 14 abuts against the guide pin 12 to compress the slot 13 of the guide pin 12.

Referring to FIG. 7 which shows a perspective view of the operating panel 5 from its rear side, the operating panel 5 is formed on its rear surface with a pair of projections 15 to be inserted into the slots 13 of the guide pins 12. In mounting the operating panel 5, the projections 15 are inserted into the slots 13 of the guide pins 12, and the screws 14 are threadedly engaged into the tapped holes 11 until the slots 13 are compressed to firmly hold the projections 15, thus fixing the operating panel 5 to the operating panel mounting portion 9 of the arm portion 4.

Figures 10, 11:
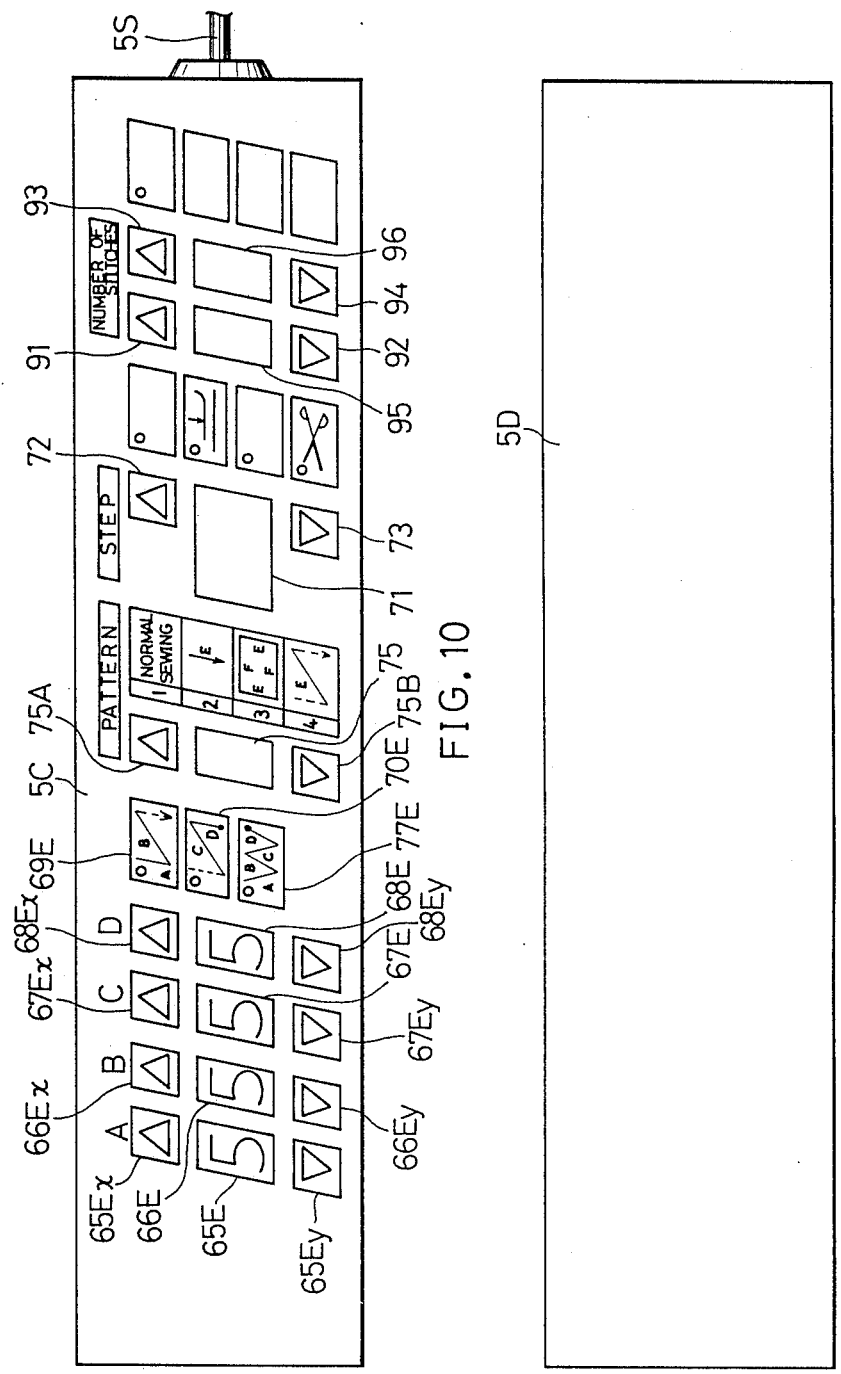
FIG. 10 is an elevational view of the third operating panel.
FIG. 11 is an elevational view of the covering panel according to the present invention.

FIGS. 8, 9 and 10 show elevational views of operating panels 5A, 5B and 5C having different functional keys, and FIG. 11 shows an elevational view of an ornamental or dummy panel 5D for covering the operating panel mounting portion 9. That is, when none of the operating panel 5A, 5B and 5C is mounted on the arm portion 4, the panel 5D acts to cover the pin holes 10 and acts as an ornament on the arm portion 4 of the machine body 2. The panel 5D is formed on its rear surface with projections similar to the projections 15 of the operating panel 5. Each of the operating panels 5A, 5B and 5C is provided with a signal cable 5S to be electrically connected to the control box 7. The signal cable 5S is provided at its end with a cable connector (not shown). On the other hand, the control box 7 is provided with a signal cable (not shown), and the signal cable is provided at its end with a cable connector (not shown). Thus, the cable connector provided on the side of the mounted operating panel is electrically connected to the cable connector provided on the control box.

When the cover panel 5D is mounted on the arm portion 4 of the machine body 2, that is, when none of the operating panels 5A, 5B and 5C is mounted on the arm portion 4, the sewing machine 1 is capable of carrying out a basic control mode for basic functions such as needle position stop, thread cutting, thread wiping, reverse sewing, presser foot lifting, slow start, compensation sewing and automatic sewing. The operating switches for controlling these basic functions are mounted on the machine body 2 or control box 7, and these basic functions can be carried out without being equipped with any of operating panels 5A, 5B and 5C.

When the operating panel 5A shown in FIG. 8 is mounted on the arm portion 4, the sewing machine 1 is capable of carrying out additional functions such as start/end backtack sewing and stitch number sewing. In the case of carrying out the start/end backtack sewing, the number of stitches is set by depressing stitch number setting keys 61x, 61y, 62x and 62y (increment keys 61x and 62x and decrement keys 61y and 62y). The number of stitches (0–9) for a first step A set by the stitch number setting keys 61x and 61y is displayed by s stitch number display 61. Similarly, the number of stitches (0–9) for a second step B set by the stitch number setting keys 62x and 62y is displayed by a stitch number display 62. Then, a start backtack key 63 and an end backtack key 64 are depressed to recognize the setting of the number of stitches for the start/end backtack sewing. In the case of carrying out the stitch number sewing, the number of stitches are set by depressing the stitch number setting keys 61x, 61y, 62x and 62y. The number of stitches (0–99) for a step E set by the stitch number setting keys 61x–62y is displayed by the stitch number displays 61 and 62. Then, a stitch number sewing key 76 is depressed to recognize the setting of the number of stitches for the stitch number sewing. In the above setting operation for the start/end backtack sewing, the number of stitches for the start backtack sewing is the same as the number of stitches for the end backtack sewing.

When the operating panel 5B shown in FIG. 9 is mounted on the arm portion 4, the sewing machine 1 is capable of carrying out further functions such as start-/end backtack sewing wherein the number of stitches for start backtack sewing is different from that for end backtack sewing, continuous backtack sewing and label attachment sewing. In the case of carrying out the start-/end backtack sewing wherein the number of stitches for the start backtack sewing is different from that for the end backtack sewing, the number of stitches for a first step A in the start backtack sewing is set by depressing stitch number setting keys 65x and 65y (increment key 65x and decrement key 65y). The number of stitches (0-9) set by the stitch number setting keys 65x and 65y is displayed by a stitch number display 65. Similarly, the number of stitches for a second step B in the start backtack sewing is set by depressing stitch number setting keys 66x and 66y (increment key 66x and decrement key 66y). The number of stitches (0-9) set by the stitch number setting keys 66x and 66y is displayed by a stitch number display 66. Similarly, the number of stitches for a first step C in the end backtack sewing is set by depressing stitch number setting keys 67x and 67y (increment key 67x and decrement key 67y). The number of stitches (0-9) set by the stitch number setting keys 67x and 67y is displayed by a stitch number display 67. Finally, the number of stitches for a second step D in the end backtack sewing is set by depressing stitch number setting keys 68x and 68y (increment key 68x and decrement key 68y). The number of stitches (0-9) set by the stitch number setting keys 68x and 68y is displayed by a stitch number display 68. Then, a start backtack sewing key 69 and an end backtack sewing key 70 are depressed to recognize the setting of the number of stitches for the first and second strokes in the start backtack sewing and the setting of the number of stitches for the first and second strokes in the end backtack sewing.

In the case of carrying out the continuous backtack sewing, the number of stitches for a first step A is set by depressing the stitch number setting keys 65x and 65y. The number of stitches (0-9) set by the stitch number setting keys 65x and 65y is displayed by the stitch number display 65. Then, the number of stitches for a second step B is set by depressing the stitch number setting keys 66x and 66y. The number of stitches (0-9) set by the stitch number setting keys 66x and 66y is displayed by the stitch number display 66. Then, the number of stitches for a third step C is set by depressing the stitch number setting keys 67x and 67y. The number of stitches (0-9) set by the stitch number setting keys 67x and 67y is displayed by the stitch number display 67. Finally, the number of stitches for a fourth step D is set by depressing the stitch number setting keys 68x and 68y. The number of stitches (0-9) set by the stitch number setting keys 68x and 68y is displayed by the stitch number display 68. Then, a continuous backtack sewing key 77 is depressed to recognize the setting of the number of stitches for the continuous backtack sewing.

In the case of carrying out label attachment sewing, the number of stitches for first and third steps E is set by depressing the stitch number setting keys 67x, 67y, 68x and 68y. The number of stitches (0-99) set by the stitch number setting keys 67x-68y is displayed by the stitch number displays 67 and 68. Similarly, the number of stitches for second and fourth steps F is set by depressing the stitch number setting keys 65x, 65y, 66x and 66y. The number of stitches (0-99) set by the stitch number setting keys 65x- 66y is displayed by the stitch number displays 65 and 66. Then, a label attachment sewing key 78 is depressed to recognize the setting of the number of stitches for the label attachment sewing.

When the operating panel 5C shown in FIG. 10 is mounted on the arm portion 4, the sewing machine 1 is capable of carrying out a programmed sewing in addition to the functions obtainable by using the operating panels 5A and 5B. The operating panel 5C includes stitch number setting keys 65Ex-68Ex and 65Ey-68Ey (increment keys 65Ex-68Ex and decrement keys 65Ey-68Ey) for start/end backtack sewing or continuous backtack sewing, stitch number displays 65E-68E for start/end backtack sewing or continuous backtack sewing, a start backtack sewing key 69E, an end backtack sewing key 70E, and a continuous backtack sewing key 77E. These keys are operated in the same manner as those of the operating panel 5B shown in FIG. 9.

The operating panel 5C further includes pattern setting keys 75A and 75B and a pattern number display 75 for carrying out normal sewing (pattern 1), stitch number sewing (pattern 2), label attachment sewing (pattern 3), and pleat presser sewing (pattern 4). In the case of carrying out the normal sewing, the pattern setting keys 75A and 75B are depressed to display a pattern number 1 on the pattern number display 75, thereby setting a normal sewing mode. Similarly, when the pattern setting keys 75A and 75B are depressed to display a pattern number 2 on the pattern number display 75, a stitch number sewing mode similar to that in the operating panel 5A as previously mentioned is set. Similarly, when pattern numbers 3 and 4 are displayed on the pattern display 75, a label attachment sewing mode and a pleat presser sewing mode are set, respectively. The number of stitches for the pattern numbers 2, 3 and 4 is set by depressing stitch number setting keys 91, 92, 93 and 94 (increment keys 91 and 93 and decrement keys 92 and 94). The number of stitches (0-99) set by the stitch number setting keys 91-94 is displayed by stitch number displays 95 and 96.

When pattern numbers 5-9 are displayed by operating the pattern setting keys 75A and 75B, a programmed sewing may be carried out. For example, when the pattern number 5 is displayed to set the number of stitches for a pocket sewing, step setting keys 72 and 73 (increment key 72 and decrement key 73) are depressed to display a step number 1 on a step number display 71. Then, the stitch number setting keys 91-94 are depressed to display the number of stitches (0-99) for the step 1. Similarly, the step setting keys 72 and 73 are depressed to display a step number 2, and the number of stitches for the step 2 is set in the same manner as above. Then, in the subsequent steps required by the pocket sewing, the number of stitches is set similarly.

Figure 12:
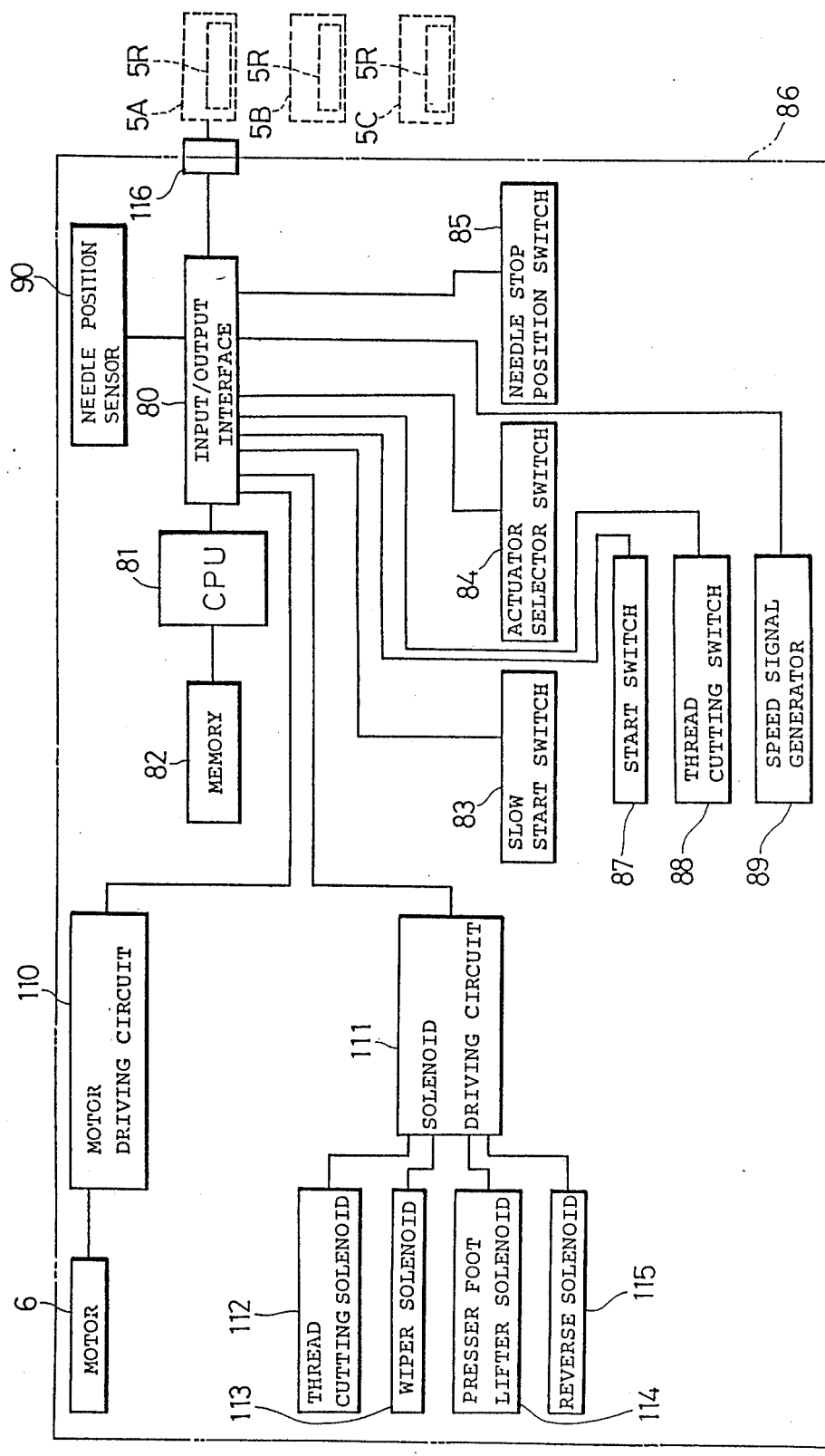
FIG. 12 is an electric control block diagram according to the present invention.

Referring to FIG. 12 which shows an electric control block diagram, one of the operating panels 5A, 5B and 5C is electrically connected through a connector 116 to an I/O interface 80. Each of the operating panels 5A, 5B and 5C includes a discrimination signal generating circuit 5R for outputting discrimination signals peculiar to each kind of the operating panels. The above-mentioned various keys, displays and discrimination signal generating circuit 5R are connected through the I/O interface 80 to a central processing unit (CPU) 81. A needle position sensor 90 for generating a needle upper position signal and a needle lower position signal is connected through the I/O interface 80 to the CPU 81. The CPU 81 is connected to a memory 82 such as RAM and ROM, so as to control the sewing machine 1 according to a control program stored in the memory 82. The memory 82 stores an operating panel discriminating program for discriminating the kinds of the operating panels 5A, 5B and 5C according to the discrimination signal outputted from the discrimination signal generating circuit 5R. The memory 82 also stores a basic control program for controlling the sewing machine 1 according to the following basic function modes when none of the operating panels is connected to the control box. The basic function modes include a needle position stop mode for setting upper and lower stop positions of a needle vertically moving, a thread cutting mode for cutting upper and lower threads when the treadle 8 is depressed back under the condition where a rotating speed of the motor 6 becomes lower than a predetermined speed, a thread wiping mode for wiping the threads cut in the thread cutting mode so as to prevent the threads from appearing over a cloth to be sewn, a reverse mode for reversing a feeding direction of the cloth, a presser foot lifting mode for lifting a presser foot, a slow start mode for slowing the rotating speed of the motor 6 at starting, a compensation sewing mode for carrying out compensation sewing wherein the needle motion produced by forwardly depressing the treadle 8 is stopped before an object end position, and the needle is then operated one stitch by one from the stop position to the object end position, and an automatic sewing mode for automatically operating the sewing machine 1 without depressing the treadle 8.

The control block 86 of the sewing machine 1 includes various operation switches for selecting the basic function modes, such as a slow start switch 83 for selecting the slow start mode, an actuator selecting switch 84 for selecting the reverse mode or the compensation sewing mode, a needle stop position switch 85 for selecting the needle position stop mode, a start switch 87 for starting the motor 6 when the treadle 8 is depressed forward, a thread cutting switch 88 for selecting the thread cutting mode, and a speed signal generator 89 for controlling the rotating speed of the motor 6 according to an amount of depression of the treadle 8. Each of output signals from these switches is fed through the I/O interface 80 to the CPU 81.

The I/O interface 80 is connected to a motor driving circuit 110 for supplying a driving power to the motor 6 and a solenoid driving circuit 111 for driving a thread cutting solenoid 112 to be driven in the thread cutting mode, a wiper solenoid 113 to be driven in the thread wiping mode, a presser foot lifter solenoid 114 to be driven in the presser foot lifting mode, and a reverse solenoid 115 to be driven in the reverse mode. The electric control block 86 is provided commonly for the sewing machine 1.

Figure 13:
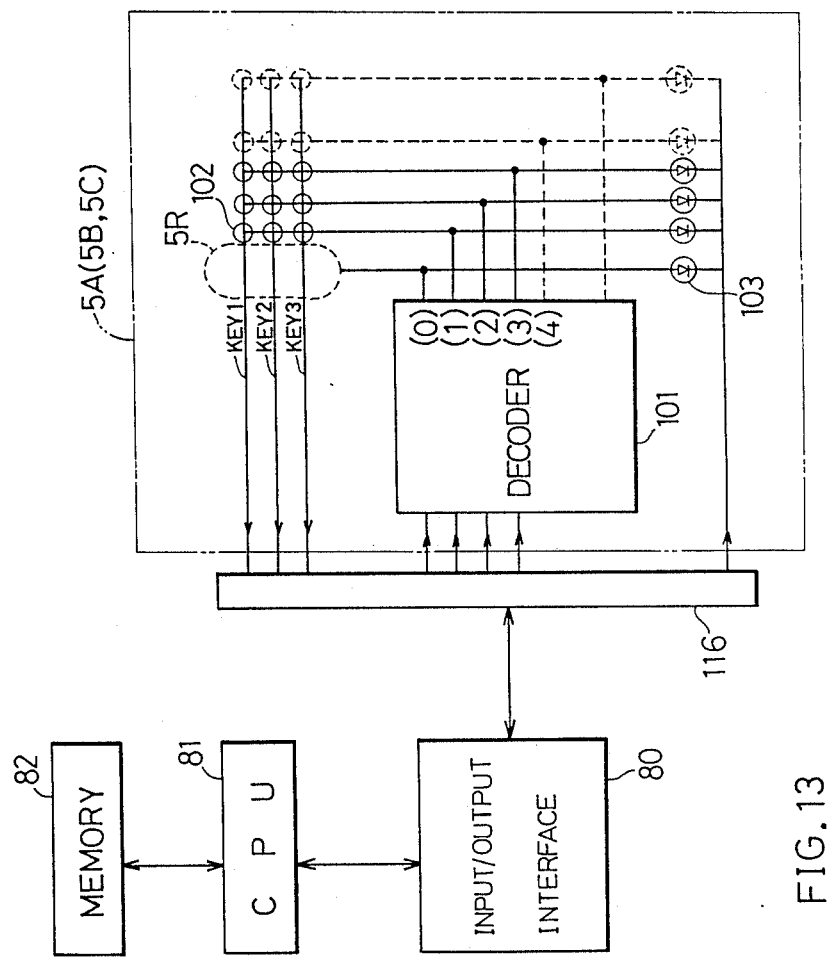
FIG. 13 is an internal circuit diagram of each operating panel.

FIG. 13 shows an internal circuitry of the operating panel including the discrimination signal generating circuit 5R in connection with the CPU 81 through the connector 116 and the I/O interface 80. The CPU 81 sequentially generates decode signals at a predetermined timing for specifying the output terminals (0), (1), (2), (3), (4) . . . of a decoder 101 provided in the operating panel. The decode signals are sequentially input to the decoder 101, and discrimination signals are sequentially output from the output terminals (0), (1), (2), (3), (4) . . . of the decoder 101. When a decode signal specifying the output terminal (0) is input to the decoder 101, and a logic "1" signal is output from the output terminal (0) of the decoder 101, and if the operating panel 5A is connected to the sewing machine 1, a logic "1" signal is outputted from a line KEY1 to the CPU 81 since the output terminal (0) of the decoder 101 is connected to the line KEY1 in the operating panel 5A as shown in FIG. 14. Accordingly, the CPU 81 determines that the operating panel 5A is connected to the sewing machine 1.

Similarly, if the operating panel 5B is connected to the sewing machine 1, a logic "1" signal is outputted from a line KEY2 to the CPU 81 since the output terminal (0) of the decoder 101 is connected to the line KEY2 in the operating panel 5B as shown in FIG. 15. Accordingly, the CPU 81 determines that the operating panel 5B is connected to the sewing machine 1.

Similarly, if the operating panel 5C is connected to the sewing machine 1, a logic "1" signal is output from a line KEY3 to the CPU 81 since the output terminal (0) of the decoder 101 is connected to a line KEY3 in the operating panel 5C as shown in FIG. 16. Accordingly, the CPU 81 determines that the operating panel 5C is connected to the sewing machine 1.

Referring to FIG. 13, circles 102 shown in matrix circuit formed by the output terminals (0), (1), (2), (3), (4) . . . of the decoder 101 and the line KEY1, KEY2 and KEY 3 designate contacts of the various keys provided on the operating panels, and reference numeral 103 designates a light emitting diode as an indicator provided for each key.

Figure 17:
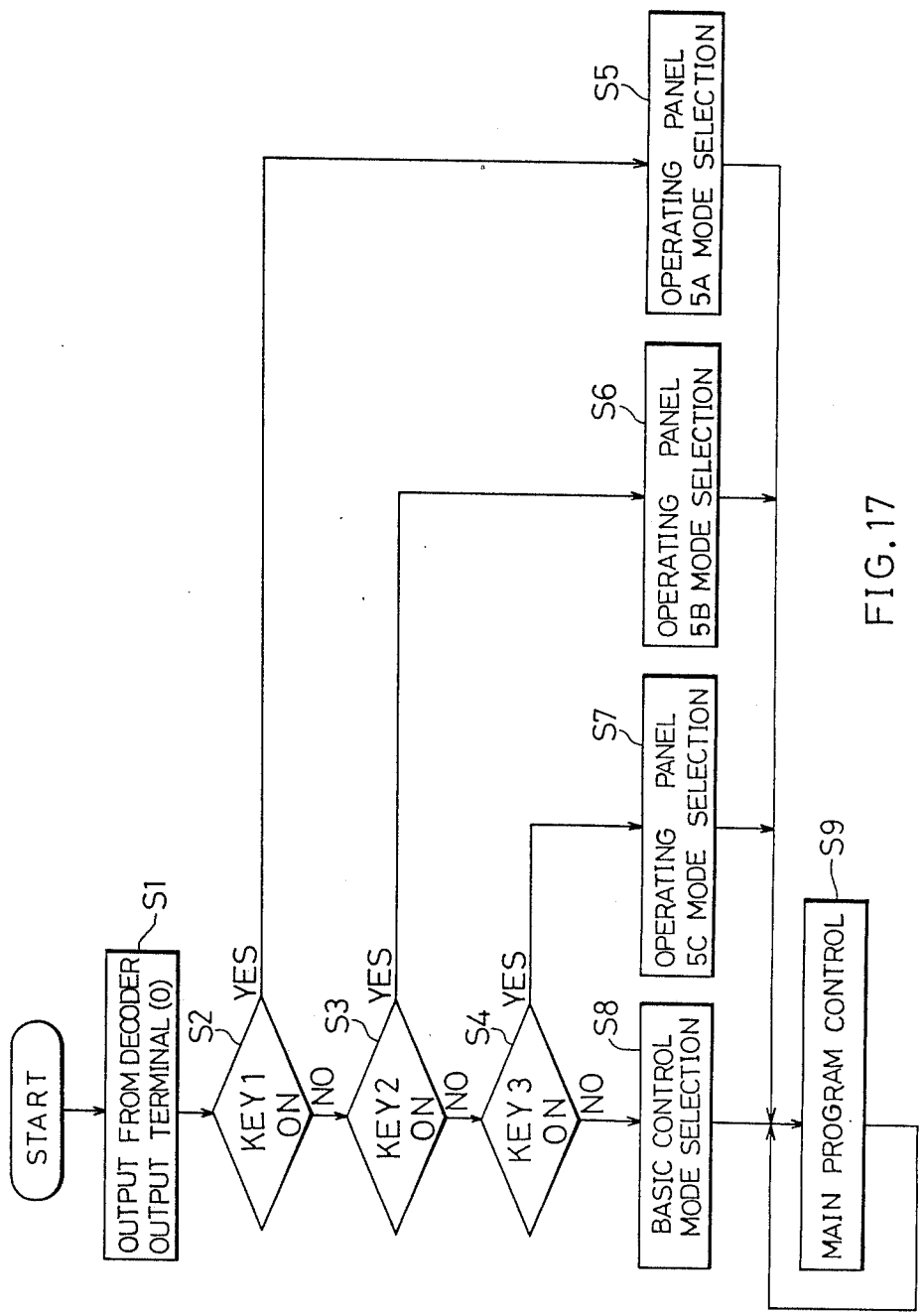
FIG. 17 is a flow chart for discrimination of the kinds of the operating panels and selection of the control modes according to the operating panels discriminated.

FIG. 17 shows a flow chart for discrimination of the operating panels and execution of the mode selected by one of the operating panels as well as the basic function mode.

Referring to FIG. 17, in step S1, the CPU 81 generates a decode signal for outputting a logic "1" signal from the output terminal (0) of the decoder 101, and feeds the decode signal through the I/O interface 80 to the decoder 101. In step S2, it is determined whether or not a logic "1" signal is outputted from the line KEY1. If YES, the CPU 81 determines that the operating panel 5A is connected to the sewing machine 1. Then, the program proceeds to step S5 where the control mode by the operating panel 5A is selected. If NO in step S2, it is determined in step S3 whether or not a logic "1" signal is outputted from the line KEY2. If YES in step S3, the CPU 81 determines that the operating panel 5B is connected to the sewing machine 1. Then, the program proceeds to step S6 where the control mode by the operating panel 5B is selected. If NO in step S3, it is determined in step S4 whether or not a logic "1" signal is outputted from the line KEY3. If YES in step S4, the CPU 81 determines that the operating panel 5C is connected to the sewing machine 1. Then, the program proceeds to step S7 where the control mode by the operating panel 5C is selected. If NO in step S4, the CPU 81 determines that none of the operating panels 5A, 5B and 5C is connected to the sewing machine. Then, the program proceeds to step S8 where the basic function mode is selected.

Thus, after any of the steps S5, S6, S7 or S8 is selected, the program proceeds to step S9 where the main program is executed.

In the case that any of the operating panels 5A, 5B or 5C is connected to the sewing machine, the above-mentioned various sewing modes such as start/end backtack sewing mode, stitch number sewing mode, continuous backtack sewing mode, label attachment sewing mode, pleat presser sewing mode and programmed sewing mode are set according to the selected operating panel, and then the number of stitches is set in the sewing mode selected. Then, it is recognized by the CPU 81, and is stored in the memory 82. Thereafter, when the treadle 8 is depressed forward, the CPU 81 recognizes the start of sewing to output a motor driving signal to the motor driving circuit 110 so as to drive the motor 6. Then, a motor driving signal is supplied from the motor driving circuit 110 to the motor 6 to thereby drive the sewing machine 1. At this time, the CPU 81 counts the number of stitches, based on the needle position signal output from the needle position sensor 90, to make it equal to a set value of the number of stitches in the selected sewing mode, and every time the number of stitches counted reaches the set value, the CPU 81 operates to stop the motor 6 and thereby stop the needle at the lower needle position. At the end of stitching in each of the selected sewing modes, or during the course of the stitching operation, when the thread cutting mode is selected, the CPU 81 outputs a thread cutting solenoid driving signal to the solenoid driving circuit 111. Then, a solenoid driving voltage is applied from the solenoid driving circuit 111 to the thread cutting solenoid 112. The thread cutting solenoid 112 operates a cutter (not shown) to cut the thread, and thereafter the needle is stopped at the needle upper position. Similarly, when the operation signals are input from the other various switches through the I/O interface 80 to the CPU 81 according to the selected mode, a wiper solenoid 113, a presser foot lifter solenoid 114 and a reverse solenoid 115 are driven to carry out thread wiping, presser foot lifting and cloth reverse feeding, respectively.

In the case that none of the operating panels 5A, 5B or 5C is connected to the sewing machine 1, the sewing machine 1 is operated in accordance with the previously mentioned basic function mode.

Having thus described the preferred embodiment of the invention, it should be understood that numerous structural modifications and adaptations may be made without departing from the spirit of the invention.

What is claimed is:

1. A sewing machine comprising a control device and a plurality of driving devices adapted to be controlled by said control device, said control device having a central processing unit, a memory connected to said central processing unit and an input/output interface connected to said central processing unit, wherein said memory preliminarily stores a basic control program for normal operation of said sewing machine and a plurality of additional control programs to be executed in addition to said basic control program, and is adapted to store parameters to be used with said additional control programs, the sewing machine further comprising a plurality of operating panels for selecting one of said additional control programs and inputting said parameters, wherein said operating panels are selectively connectable to said control device, and when one of said operating panels is connected to said control device, said control device controls said driving devices according to said basic control program, one of said additional control programs selected and said parameters input through said connected operating panel while when none of said operating panels is connected to said control device, said control device controls said driving devices according to said basic control program.

2. The sewing machine as defined in claim 1, wherein said basic control program includes a needle positioning control program, a speed control program, a fabric reverse control program, and a thread cutting control program.

3. A sewing machine comprising a control device and a plurality of driving devices adapted to be controlled by said control device, said control device having a central processing unit, a memory connected to said central processing unit and an input/output interface connected to said central processing unit, wherein said memory preliminarily stores a plurality of control programs for formation of a plurality of stitch patterns, and is adapted to store parameters to be used with said control programs, the sewing machine further comprising a plurality of operating panels for selecting one of said control programs and inputting said parameters, wherein said operating panels are selectively connectable to said control device, and said operating panels include circuits for outputting discrimination signals peculiar to each of said operating panels, and when one of said operating panels is connected to said control device, said control device discriminates said discrimination signal output from said operating panel and controls said driving devices according to the selected control program and said parameters input through said connected operating panel.

4. The sewing machine as defined in claim 3, wherein each of said operating panels includes a decoder for inputting a decode signal output from said control device and outputting said discrimination signals peculiar to each of said operating panels.

5. A sewing machine comprising a control device and a plurality of driving devices adapted to be controlled by said control device, said control device having a central processing unit, a memory connected to said central processing unit and an input/output interface connected to said central processing unit, wherein said memory preliminarily stores a basic control program for normal operation of said sewing machine, the basic control program including a needle positioning function and a thread cutting function, and a plurality of additional control programs for controlling sewing steps and the number of stitches thereof, said additional control programs to be executed in addition to said basic control program, said memory being adapted to store parameters for the sewing steps and the number of stitches to be used with said additional control programs, the sewing machine further comprising a plurality of operating panels for selecting one of said additional control programs and inputting said parameters, wherein said operating panels are selectively connectable to said control device, and when one of said operating panels is connected to said control device, said control device controls said driving devices according to said basic control program, one of said additional control programs selected and said parameters input through said connected operating panel, while when none of said operating panels is connected to said control device, said control device controls said driving devices according to said basic control program.

6. A sewing machine comprising a control device and a plurality of driving devices adapted to be controlled by said control device, said control device having a central processing unit, a memory connected to said central processing unit and an input/output interface connected to said central processing unit, wherein said memory preliminarily stores a plurality of control programs for controlling needle positioning, thread cutting, sewing steps and the number of stitches thereof, and is adapted to store parameters for the sewing steps and the number of stitches to be used with said control programs, the sewing machine further comprising a plurality of operating panels for selecting one of said control programs and inputting said parameters, wherein said operating panels are selectively connectable to said control device, and said operating panels include discrimination circuits for outputting discrimination signals peculiar to each of said operation panels, and when one of said operating panels is connected to said control device, said control device discriminates said discrimination signal output from the discrimination circuit of said connected operating panel and controls said driving devices according to the selected control program and said parameters input through said connected operating panel.

* * * * *